United States Patent
Finnie et al.

(10) Patent No.: US 10,120,719 B2
(45) Date of Patent: Nov. 6, 2018

(54) MANAGING RESOURCE CONSUMPTION IN A COMPUTING SYSTEM

(71) Applicant: International Business Machines Corporation, Armonk, NY (US)

(72) Inventors: James L. Finnie, Boeblingen (DE); Torsten Steinbach, Holzgerlingen (DE); Michael Wurst, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/660,207

(22) Filed: Mar. 17, 2015

(65) Prior Publication Data

US 2015/0363237 A1 Dec. 17, 2015

(30) Foreign Application Priority Data

Jun. 11, 2014 (GB) .................................. 1410350.1

(51) Int. Cl.
*G06F 9/50* (2006.01)
(52) U.S. Cl.
CPC .............. *G06F 9/5016* (2013.01); *G06F 9/50* (2013.01); *G06F 9/5005* (2013.01)
(58) Field of Classification Search
CPC ........ G06F 9/5016; G06F 9/50; G06F 9/5005; G06F 9/5011
USPC ....................................................... 718/104
See application file for complete search history.

(56) References Cited

U.S. PATENT DOCUMENTS

| | | | | |
|---|---|---|---|---|
| 6,058,393 A | * | 5/2000 | Meier ................. | G06F 11/3664 707/999.01 |
| 6,324,683 B1 | * | 11/2001 | Fuh ....................... | G06F 11/362 714/E11.21 |
| 6,353,818 B1 | | 3/2002 | Carino, Jr. | |
| 6,609,214 B1 | * | 8/2003 | Dahlen ................. | G06F 9/5011 714/15 |
| 6,789,074 B1 | | 9/2004 | Hara et al. | |
| 6,938,044 B1 | | 8/2005 | Milby | |
| 7,032,222 B1 | * | 4/2006 | Karp ...................... | G06F 9/5011 709/226 |
| 7,289,495 B2 | * | 10/2007 | Roy .................... | H04L 12/5895 370/381 |

(Continued)

OTHER PUBLICATIONS

Stack Overflow, "How to measure actual memory usage of an application or process?", Sep. 25, 2008, last retrieved from http://stackoverflow.com/questions/131303/how-to-measure-actual-memory-usage-of-an-application-or-process on Oct. 31, 2015.*

(Continued)

*Primary Examiner* — Andrew M. Lyons
(74) *Attorney, Agent, or Firm* — Cantor Colburn LLP

(57) ABSTRACT

Embodiments relate to managing resource consumption in a computing system. An aspect includes providing a resource policy by defining a plurality of threshold values relating to the resource consumption, wherein the resources are consumed by a plurality of user-defined functions performing tasks for a database management system, wherein the user-defined functions are executed by a plurality of processes external to the database management system. Another aspect includes performing an action, as defined by the resource policy, on at least one of the user-defined functions.

12 Claims, 6 Drawing Sheets

(56) References Cited

U.S. PATENT DOCUMENTS

| | | | | |
|---|---|---|---|---|
| 8,065,682 B2* | 11/2011 | Baryshnikov | G06F 9/5027 | 718/100 |
| 8,332,857 B1* | 12/2012 | Brown | G06F 17/30463 | 707/718 |
| 8,745,032 B1* | 6/2014 | Brown | G06F 17/30442 | 707/713 |
| 8,966,493 B1* | 2/2015 | Richards | G06F 9/46 | 718/104 |
| 2005/0044063 A1* | 2/2005 | Barsness | G06F 17/30457 | |
| 2005/0081210 A1* | 4/2005 | Day | G06F 9/5016 | 718/104 |
| 2005/0240934 A1* | 10/2005 | Patterson | G06F 3/0613 | 718/105 |
| 2006/0026116 A1 | 2/2006 | Day et al. | | |
| 2007/0061375 A1* | 3/2007 | Brown | G06F 17/30575 | |
| 2007/0156670 A1* | 7/2007 | Lim | G06F 21/6218 | |
| 2008/0209428 A1* | 8/2008 | Baryshnikov | G06F 9/5027 | 718/104 |
| 2009/0025004 A1* | 1/2009 | Barnard | G06F 9/50 | 718/104 |
| 2009/0150338 A1* | 6/2009 | Forstie | G06F 17/30477 | |
| 2010/0049570 A1* | 2/2010 | Li | G06Q 10/06 | 718/104 |
| 2011/0231457 A1* | 9/2011 | Tager | G06F 17/30306 | 707/825 |
| 2013/0086587 A1* | 4/2013 | Naik | G06F 11/0781 | 718/100 |
| 2013/0110862 A1* | 5/2013 | Chen | G06F 17/30477 | 707/766 |
| 2013/0260891 A1* | 10/2013 | Kruglick | G07F 17/3225 | 463/42 |
| 2014/0075029 A1* | 3/2014 | Lipchuk | G06F 9/505 | 709/226 |
| 2014/0089311 A1* | 3/2014 | Richards | G06F 17/30306 | 707/737 |
| 2014/0095450 A1 | 4/2014 | Marwah et al. | | |
| 2015/0026692 A1* | 1/2015 | Ghosh | G06F 17/30 | 718/103 |
| 2015/0269234 A1* | 9/2015 | Castellanos | G06F 17/30563 | 707/602 |

OTHER PUBLICATIONS

Czajkowski et al., "Resource Control for Database Extensions," Department of Computer Science, Cornell University, Technical Report 98-1718, Nov. 1998.*

Hewlett-Packard Development Company, L.P., "How Resource Limits are Enforced," Oct. 18, 2013, last retrieved from https://my.vertica.com/docs/7.0.x/HTML/Content/Authoring/ProgrammersGuide/UserDefinedFunctions/HowResourceLimitsAreEnforced.htm on Oct. 21, 2016.*

N. S. Bowen, J. Antognini, R. D. Regan and N. C. Matsakis, "Availability in parallel systems: Automatic process restart," in IBM Systems Journal, vol. 36, No. 2, pp. 284-300, 1997. (Year: 1997).*

W. Kang, H. H. Huang and A. Grimshaw, "A highly available job execution service in computational service market," 2007 8th IEEE/ACM International Conference on Grid Computing, Austin, Texas, 2007, pp. 275-282. (Year: 2007).*

* cited by examiner

MANAGING RESOURCE CONSUMPTION IN A COMPUTING SYSTEM

BACKGROUND

The present disclosure relates generally to managing resource consumption in a computing system, and more specifically to a resource control system for controlling resource consumption in a computing system.

Database management systems typically allow users to define their own code, for example user-defined functions (UDFs), which are run under the control of the database management system. These UDFs may run 'fenced', meaning that they are not executed within the same process as the main database engine, they rather may be run in a separate external process spawned by the database management system, and the database management system optionally provides the UDF with input parameters, such as input data tuples if the UDF operates on cells stored within the database, and optionally receives output, such as output data tuples generated from the UDF. Since the user can provide the UDF as binary compiled code, the database management system typically has no information about runtime resource requirements of the UDF. However, it is desirable for the database management system to be able to monitor and react to resource consumption by the UDFs.

One solution is to impose a hard memory limit, e.g., operating system data 'ulimit', on external processes. However, this has the drawback that it is applied to each UDF process individually. When the memory limit is reached, this approach may result in receiving out-of memory error messages for future memory allocations for fenced user code, which will typically cause the related process to terminate. Further, the database management system may wish to spawn multiple separate user-defined processes, and thus there is no control over the aggregated memory consumption from all user-defined functions. Another solution is to instrument the target program code of the UDF such that additional program code is injected in a way that any memory allocations by the user-supplied code are intercepted. This can be cumbersome for programmers.

SUMMARY

Embodiments relate to managing resource consumption in a computing system. An aspect includes providing a resource policy by defining a plurality of threshold values relating to the resource consumption, wherein the resources are consumed by a plurality of user-defined functions performing tasks for a database management system, wherein the user-defined functions are executed by a plurality of processes external to the database management system. Another aspect includes performing an action, as defined by the resource policy, on at least one of the user-defined functions.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Various embodiments will now be described, by way of example only, with reference to the following drawings in which.

DETAILED DESCRIPTION

Figure 1:
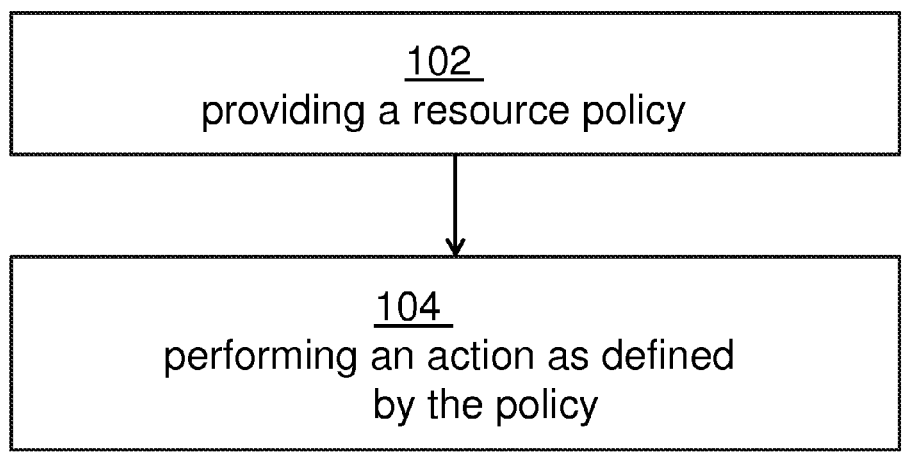
FIG. 1 shows a block diagram of an embodiment of a method for managing resource consumption in a computing system.

Embodiments disclosed herein relate to managing resource consumption in a computing system. Embodiments include asynchronous resource usage collection and control of fenced user code. According to one aspect, a method for managing resource consumption in a computing system may be provided. The resources may be consumed by a plurality of user-defined functions performing tasks for a database management system, wherein the user-defined functions may be executed by a plurality of processes external to the database management system. The method may comprise providing a resource policy by defining a plurality of threshold values relating to the resource consumption, and performing an action, as defined by the policy, on at least one of the user-defined functions.

According to another aspect a resource control system for controlling resource consumption in a computing system may be provided. Also here the resources may be consumed by a plurality of user-defined functions performing tasks for a database management system. The user-defined functions may be executed by a plurality of processes external to the database management system. The resource control system may comprise a providing unit adapted for providing a resource policy comprising a plurality of threshold values relating to the resource consumption, and an action module for performing an action, as defined by the policy, on at least one of the user-defined functions.

It may be noted that the action may be directed to at least one of the user-defined functions and the policy may comprise a set of rules. It may also be noted that the database management system may optionally be external to the computing system, e.g., implemented as an appliance.

In the context of this description, the following conventions, terms and/or expressions may be used:

The term "user-defined function" may denote a function as part of a database management system that may not be part of a set of standard functions being delivered as part of the database management system (e.g., a set of predefined SQL calls). Instead, the user-defined function may be defined by an individual programmer extending the predefined functions of the database management system. Hence, a user-defined function is basically a mechanism for extending the functionality of the database server by adding a function as precompiled program code that may be evaluated in SQL statements. User-defined functions in SQL may be declared using the CREATE FUNCTION statement. Once created, a user-defined function may be used in expressions in SQL statements. For example, it may be invoked where most other intrinsic functions are allowed. In this sense, a UDF is a fenced program code: invoked by the database management system but not under total control of the database management system in terms of resource allocation.

The term "resource policy" may denote a rule or a set of rules relating to one or more resource—as defined below—of a computing system together with a threshold value for the related resource and an action that may be invoked if the threshold value may be exceeded (above or below). The action may be directed to a treatment regarding the user-defined function.

The term "action" may denote a treatment of a user-defined function depending on the rule set in the policy. An action may comprise, e.g., a queuing, a rejection, a suspension, a forced abort, i.e., cancellation, of a user-defined function. It may be performed by a function of the operating system or by the resource control system in combination with functions of the operating system of a computing system.

The term "process" may denote a defined task under control of or with an operating system of a computer. In Unix-like operating system processes are a well-known concept. The term "process" may here be understood in that sense. In other operating systems, an equivalent term may be "job" or "task".

The term "external process" may denote a function running on a computing system that may be external to the database management system and not under complete control of the database management system (see above). It may not be controlled, i.e., its resource consumption may not be controlled by the database management system. However, the external function, e.g., a user-defined function, may be initiated, i.e., started by the database management system.

The proposed method for managing resource consumption in a computing system and the related resource control system may offer a couple of advantages:

The underlying idea goes beyond a plan-per-tuple optimization of database queries with user-defined functions. It also goes beyond a tracking of resource usage of a database management system when performing SQL queries that refer to user-defined functions for calculating royalties based on the number of time the user-defined function has been called. The idea goes also beyond the known concept of optimizing fixed disk storage costs within a database management system.

One of the advantages of the proposed method is that dynamically available and dynamically consumed resources of a computing system may be monitored and controlled, and appropriate actions may be executed if threshold values may be exceeded. These dynamically available resources may not be controlled by the database management system in case of user-defined functions. It may also not be required to extend or equip the code of the user-defined function with specific entry points or alter the code of the user-defined function in another way. Using the proposed method may not require to change or insert any of the program code of the user-defined functions. It may also be possible to apply various embodiments outside of the database management system. Thus, existing systems using UDFs may be enhanced using embodiments of a resource control system.

Additionally, operating system functions may be used to monitor and control the execution of the user-defined functions. In case of main memory consumption using a Linux operating system, the monitoring information in /proc/<pid>/, i.e., the "status" file of the Linux process may be used advantageously. Hence, the control of resource consumption of user-defined functions may be performed with only little overhead. Additionally, not only the resource consumption of a single user-defined function may be managed and controlled but also a plurality of user-defined functions, running in a plurality of separate processes. They may be classified into groups of its size (in terms of resource consumption) or they may be grouped according to groups of functions performed. Other classification schemata may be used.

Such a resource control system may also allow to only run high-priority user-defined functions, wherein the priority may be determined by a workload manager. The workload manager or a resource aware task scheduler may be based on a related configuration. It may also allow to apply a resource consumption reduction in other areas of the database management system to admit increased resource usage by the fenced user-defined functions.

According to one embodiment of the method, the resource may comprise an amount of main memory. The term "main memory" may be used here in the sense of main memory which may be coupled to one or more processors of a computing system in a 'von Neumann' architecture. Controlling and managing main memory consumption may have a direct influence on the performance of the computing system. It may allow setting priorities and controlling usage of computing resources by various users and processes. The term main memory may also apply to shared memory in multi-processor systems.

According to one advanced embodiment of the method, a calculation of the amount of main memory may be based on an aggregated amount of memory of all executing user-defined functions. This may allow a much tighter control and management of resources like user-defined functions which originate from, but which may not be directly controlled by the database management system.

According to a further embodiment of the method, the action may be based on one out of the group comprising a start time of the user-defined function, an assigned workload management priority and a size category a user-defined function is classified into. The different ways for the action may also be combined. Different actions—in particular to user-defined functions—may allow for a fine grained control mechanism for available but limited resources. Classes used for sizes in terms of memory required to run the code of the user-defined function may allow a fine tuning of resources consumed by the database management system. The size category may, e.g., comprise different categories like small, medium and large. The limits may be set by an administrator.

If, e.g., the action may be based on the start time of the user-defined function to either favor acting on the newest user-defined function first, such that long-running external processes, i.e., user-defined functions, are more favored to run to completion at which time they may release their resources. Or, the action may be directed to the oldest external processes, i.e., user-defined functions, first such that short-running external processes are favored since they are expected to release their memory resource—or other resources—more quickly, and long running external processes are considered 'runaway' user-defined functions that should be terminated.

According to one additional embodiment of the method, the resource may comprise at least one out of the group comprising a cache size of the database management system, a number of database tables, processor cycles, number of relative processor cycles—in particular, processor cycles required in comparison to total available cycles per time unit—input operations per time interval, output operations per time unit, number of involved threads and/or a combination thereof. Besides the memory consumption mentioned above, other parameters and variables in a computing system may be used to control and manage the function and allocated resources for the user-defined functions. They may also be used for tuning purposes.

In one embodiment of the method, the resource consumption of the user-defined function may be determined according to a schedule. Regular measurements of the resource consumption may be performed, e.g., in fixed time intervals. However, the schedule may also use varying time intervals. If, e.g., it may be determined that the resource consumption shows a gradient—increasing or decreasing—the time intervals to measure the resource consumption may be chosen shorter or longer. A sudden increase in resource consumption may lead to an overload of the underlying computing system and so benefit from shorter time measurement intervals. That means that the time intervals of the schedule may be dynamically adapted according to a change in the resource consumption measured over at least two time intervals of the schedule. In another embodiment, the information about the resource consumption may be delivered by the user-defined function itself or by the policy.

According to one enhanced embodiment of the method, the resource consumption of the user-defined function may be determined based on an existing component of an operating system of the computing system. In case of a Linux operating system this may be based on monitoring information available in /proc/<process_id>/, i.e., the "status" file of Linux. Thus, no additional functions may have to be implemented. Existing resources of the operating system may be used. This may also be valid for other than the Linux operating system.

Additionally, the program code of the user-defined functions may not have to be altered in order to allow the control and management functions for consumed resources. It allows for a lean implementation for resource control of user-defined functions.

In order to allow an easy overview of the user-defined functions they may be registered as external processes to the core database functions in a repository. Thus, they may be handled as fenced in the sense that they belong to the database but may run outside the direct control of the database management system.

Such a system may also allow to only running high-priority user-defined functions. The priority may be determined by a workload manager based on a related configuration. It may also allow reducing a resource consumption reduction in other areas of the database management system to allow for increased resource usage by the fenced user-defined functions.

In embodiments of the method, the action being applied to the user-defined functions may be a queuing of a request for starting of a user-defined function additional to already executing user-defined functions if a first threshold value of the policy may be exceeded. It may be noted that a plurality of policies may be defined. Each policy may comprise one or more rules to be applied if a related threshold value may be exceeded. The threshold value may be a part of the rule. Hence, a newly to be started UDF may be queued if the total main memory consumed by all UDFs, including the new UDF, may exceed a predefined threshold value.

According to one more sophisticated embodiment of the method, the action may be a rejection of a request for starting of a user-defined function additional to already executing user-defined functions if a second threshold value of the policy is exceeded. The second threshold value may be greater than a first threshold value which may define the queuing mentioned above.

In embodiments of the method, the action may also be a suspension of one of the executing user-defined function if a corresponding threshold of the policy may be exceeded. The related threshold value may be greater than the threshold value relating to the above-mentioned rejection of a new user-defined function.

In an even more advanced embodiment of the method, the action may be a forced cancellation of the user-defined function if a third threshold value, of the policy may be exceeded. The third value of the threshold may be greater than the second threshold value. The forced cancellation—or killing of the related process—may also be based on a defined set of predefined rules.

It may also be noted that the threshold values may not only be defined for a single user-defined function but also for a group of user-defined functions as well as to all user-defined functions. That means that, e.g., the total main memory consumption of all user-defined functions together may exceed threshold value and trigger a related function. Various threshold values for different resource types may be in effect simultaneously. They may be applied in addition to each other or alternatively to each other.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of a method for managing resource consumption in a computing system is given. Afterwards, further details and an embodiment of the resource control system for controlling resource consumption in a computing system will be described.

FIG. 1 shows a block diagram 100 of an embodiment of a method for resource consumption in a computing system 700. In the method for managing resource consumption in a computing system, the resources may be consumed by a plurality of user-defined functions 206, performing tasks for a database management system. This may mean that they are not running in the process of the database but "fenced" external of the database management system. Hence, the user-defined functions 206 may be executed by a plurality of processes external to the database management system. The method 100 comprises providing, in block 102, at least one resource policy—e.g., a set of rules and/or threshold values—by defining a plurality of threshold values—in particular, as one or more components of resource consumption rules—relating to the resource consumption of the one or more user-defined functions 206.

Additionally, the method comprises performing, in block 104, an action as defined by the policy, on at least one of the user-defined functions 206. The action may, e.g., be a queuing, a rejection, a suspension, a forced abort, i.e., cancellation, of a user-defined function 206.

Figure 2:
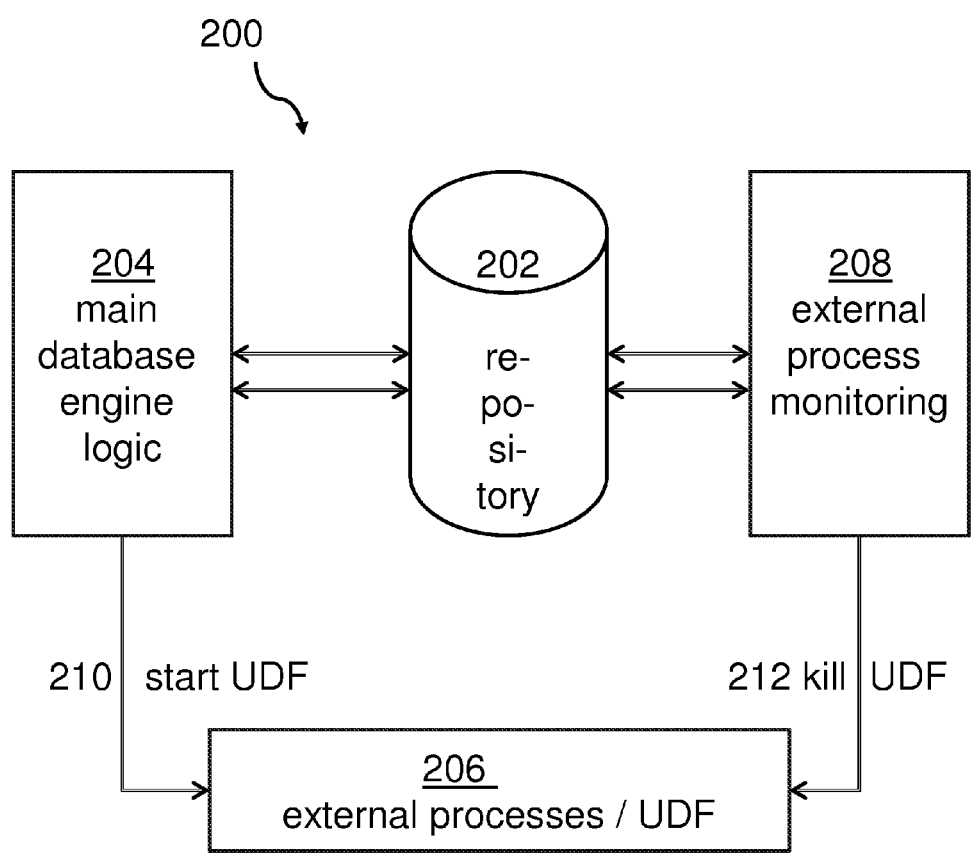
FIG. 2 shows a block diagram of core elements invocied in practicing the method.

FIG. 2 shows a block diagram 200 of core elements invoiced in practicing the method 100. The UDFs 206 may be registered in a repository 202. A main database engine logic 204 may exchange information with the repository 202 as detailed later. The same applies to the external process monitoring 208. The term "external" may denote that the process monitoring, in particular, resource monitoring, may be oriented to processes that are external to the main database engine logic 204, in particular external processes or UDFs 206.

The main database engine logic 204 may send a signal 210 to start a UDF 206. Depending on the external process monitoring 208 and according to rules defined in the policies, an action to "kill the UDF 212" may also be applied or, according to the rules policies, the UDF 206 may be queued or suspended, or rejected from staring.

Figure 3:
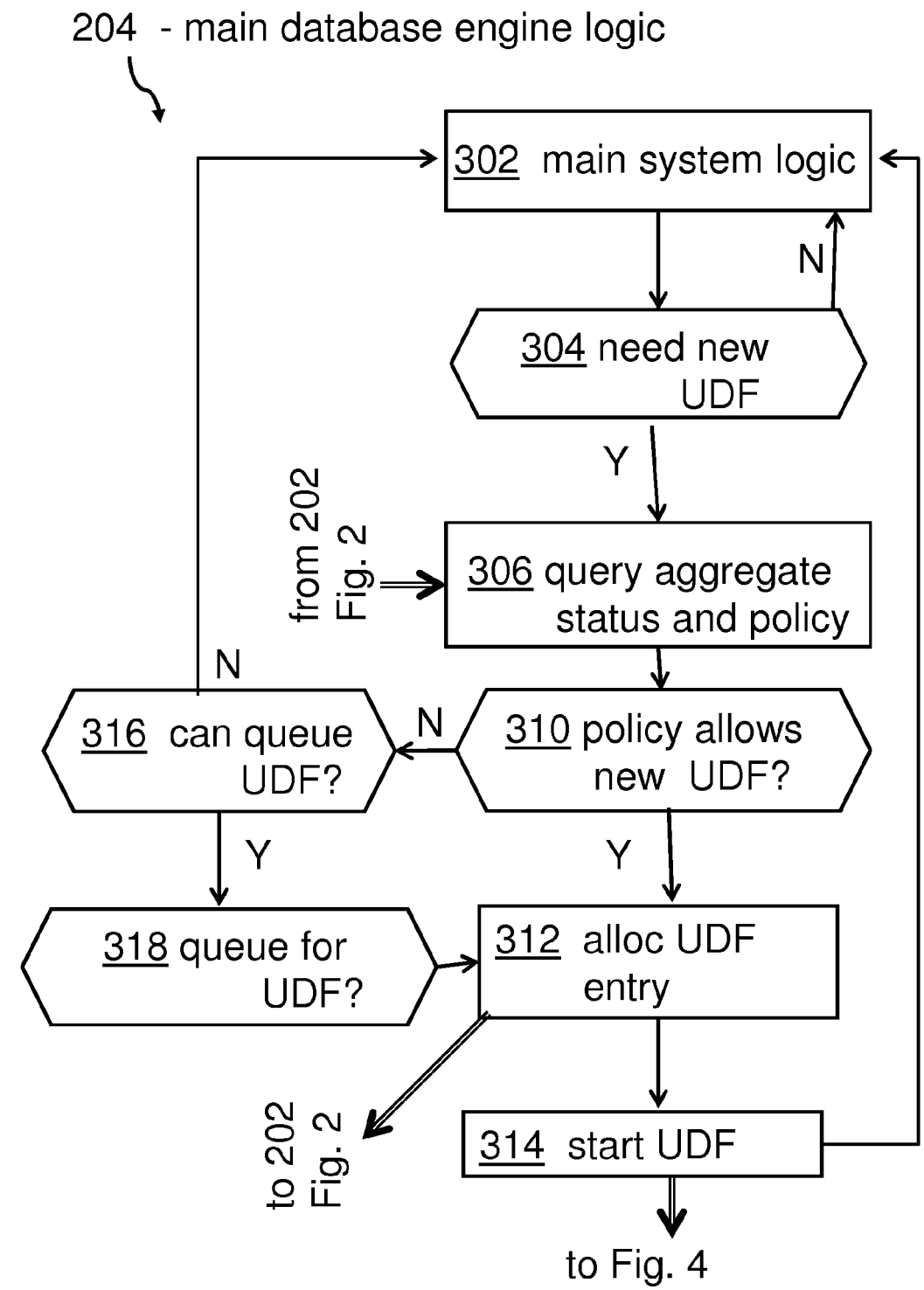
FIG. 3 shows a block diagram of a more detailed embodiment of the main database engine logic of FIG. 2.

FIG. 3 shows a block diagram of a more detailed embodiment of the main database engine logic 204 of FIG. 2. The main system logic 302, may determine, at block 304, that a new UDF 206 may be needed. In case of "no", the process sequence may go back to the main system logic of block 302. In case of "yes", an aggregated status of the UDFs 206 and related policies may be queried at block 306 from the repository 202. Here, an aggregated status about all UDFs 206 and related policies including rules and threshold values may be stored.

If at block 310, it may be determined that the policy (policies) allows the new UDF 206 to be executed—see "yes"—the UDF 206 entry may be allocated at block 312. For this purpose, an information exchange with a repository 202 may be performed again. Then, at block 314, a signal may be generated to start the new UDF 206.

If at block 310, it may be determined that according to the policy no new UDF 206 may be allowed to start, it may be determined, at block 316, if the UDF 206 may be queued. In case of "no", the process may return to the main system logic at block 302. If at block 316 it may be determined that the new UDF 206 may be queued—case "yes"—the UDF 206 may be entered, at block 318, into a queue and awaits the allocation of the UDF 206 entry at block 312.

Figure 4:
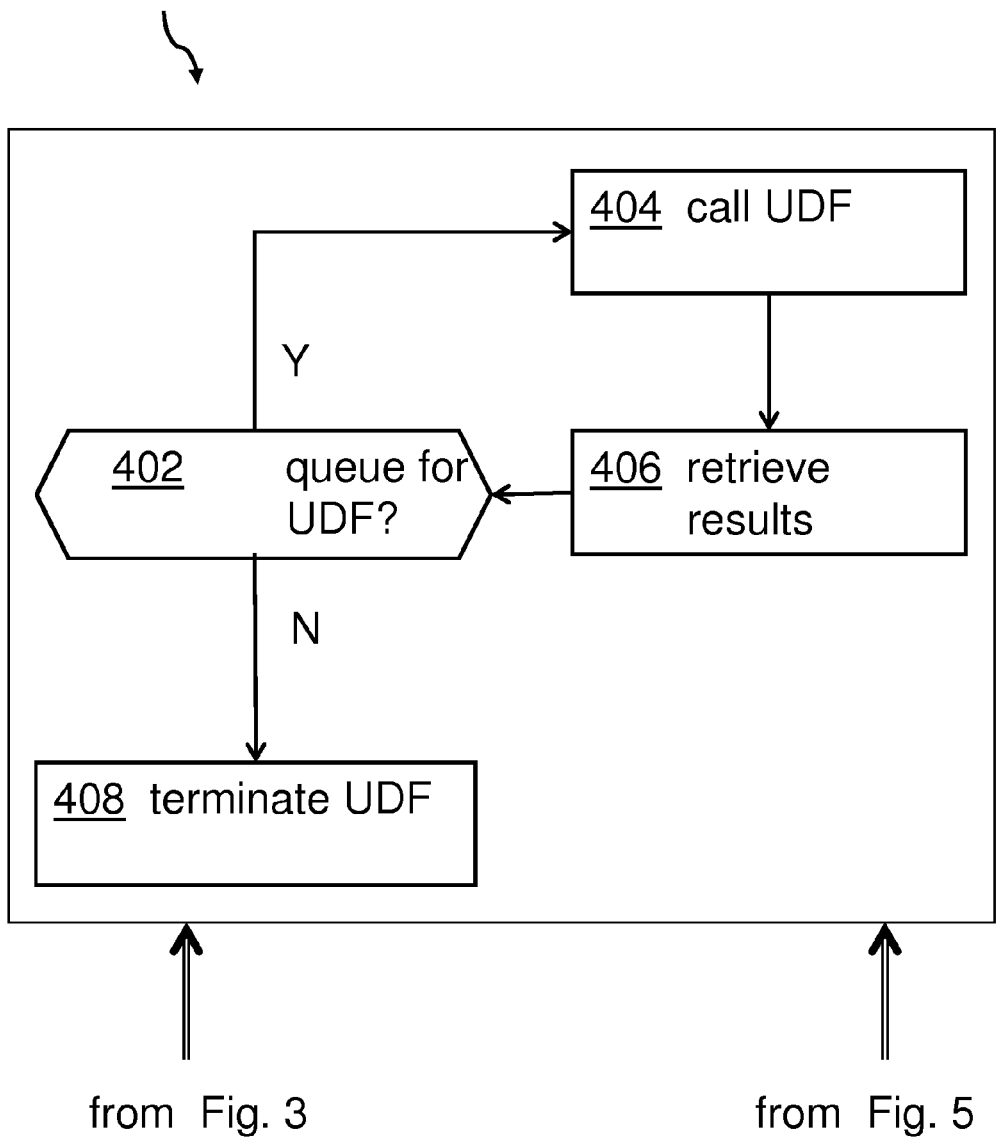
FIG. 4 shows a block diagram of a more detailed embodiment of how external processes/UDFs are managed.

FIG. 4 shows a block diagram of a more detailed embodiment of how external processes/UDFs 206 are managed. If a new UDF may be queued, at block 402, case "yes", the UDF may be called at block 404. Results may be retrieved, at block 406, and the process may continue in a loop. If, depending on a status in the repository 202, the UDF 206 may not be continued to be queued, the UDF 2ß6 may be terminated at block 408. A signal for a forced termination of the related UDF 206 may be generated by the external process monitoring 208 which is detailed in FIG. 5.

Figure 5:
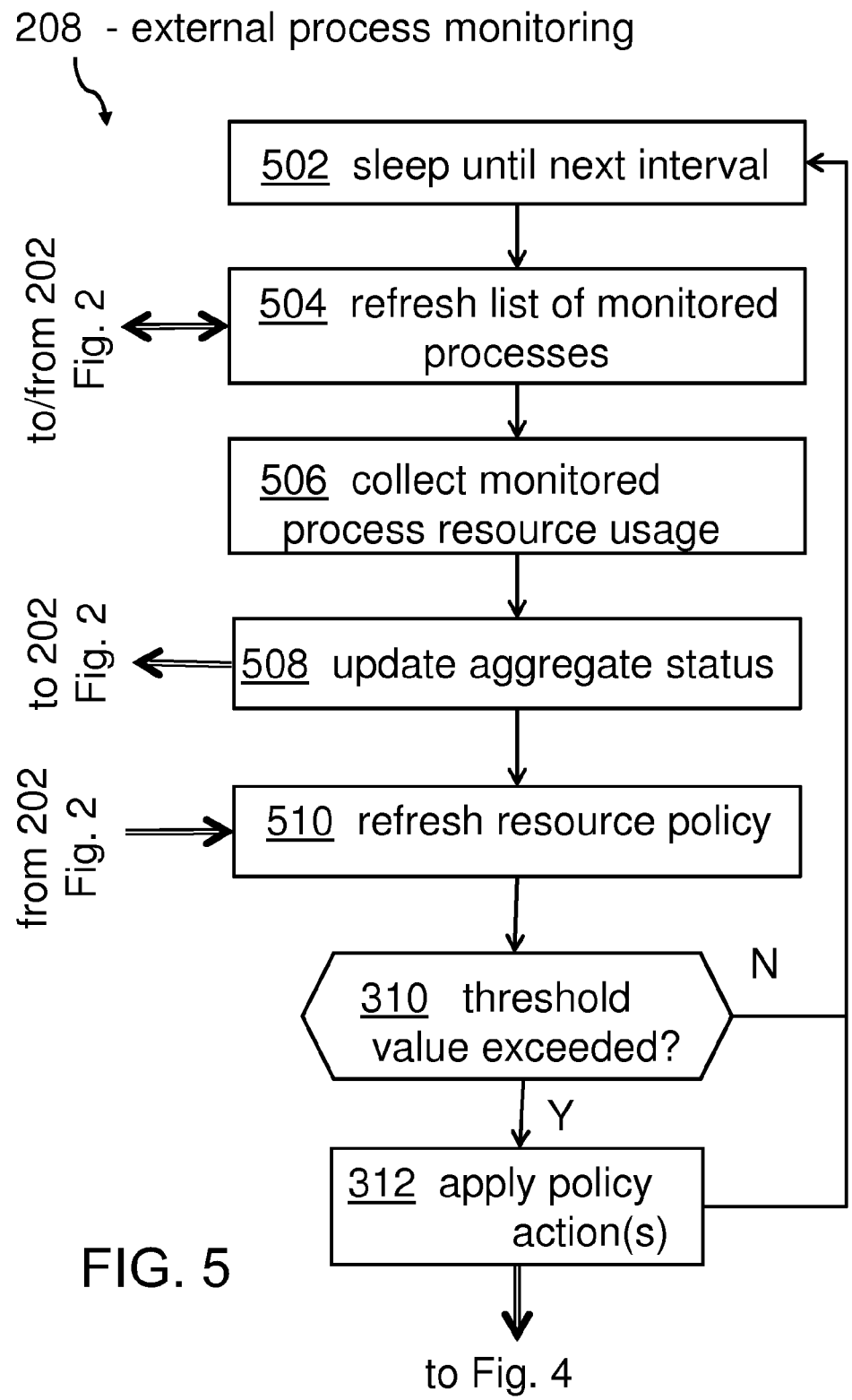
FIG. 5 shows a block diagram of a more detailed embodiment of the external process monitoring according to FIG. 2.

FIG. 5 shows a block diagram of a more detailed embodiment of the external process monitoring 208 according to FIG. 2. It may start with a sleep routine at block 502 waiting for a next monitoring interval. At block 504, a list of monitored processes may be refreshed. For this, information exchange with the repository 202 is required.

In a next process step, at block 506, the process resource usage in all of the user-defined functions 206 processed may be collected. Then, an aggregated status for all external processes/UDFs 206 may be updated and transferred over to the repository 202 in block 508. Based on this, that related resource policy (policies) may be refreshed at block 510. For this, information may be required from the repository 202.

Next, it may be determined, at block 310, whether one or more thresholds defined as part of the rule of the policy may be exceeded. In case of "yes" the action(s) defined in the policy may be executed. This may, e.g., trigger a signal 212 to kill a related UDF 206. Depending on the policy at block 312 or depending on the consumed resources in comparison to a defined threshold, the process may return to the sleep routine of at block 502.

Figure 6:
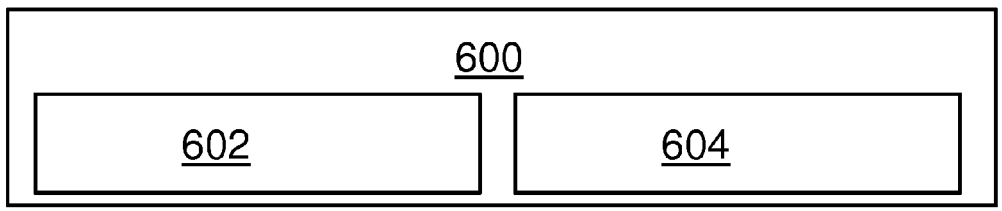
FIG. 6 shows a block diagram of an embodiment of the resource control system.

FIG. 6 shows a block diagram of an embodiment of the resource control system 600. The resource control system 600 may comprise at least two blocks: (a) a providing unit 602 which may be adapted for providing a resource policy comprising a plurality of threshold values relating to the resource consumption, and (b) an action module 604 for performing an action, as defined by the policy, on at least one of the user-defined functions 206.

Figure 7:
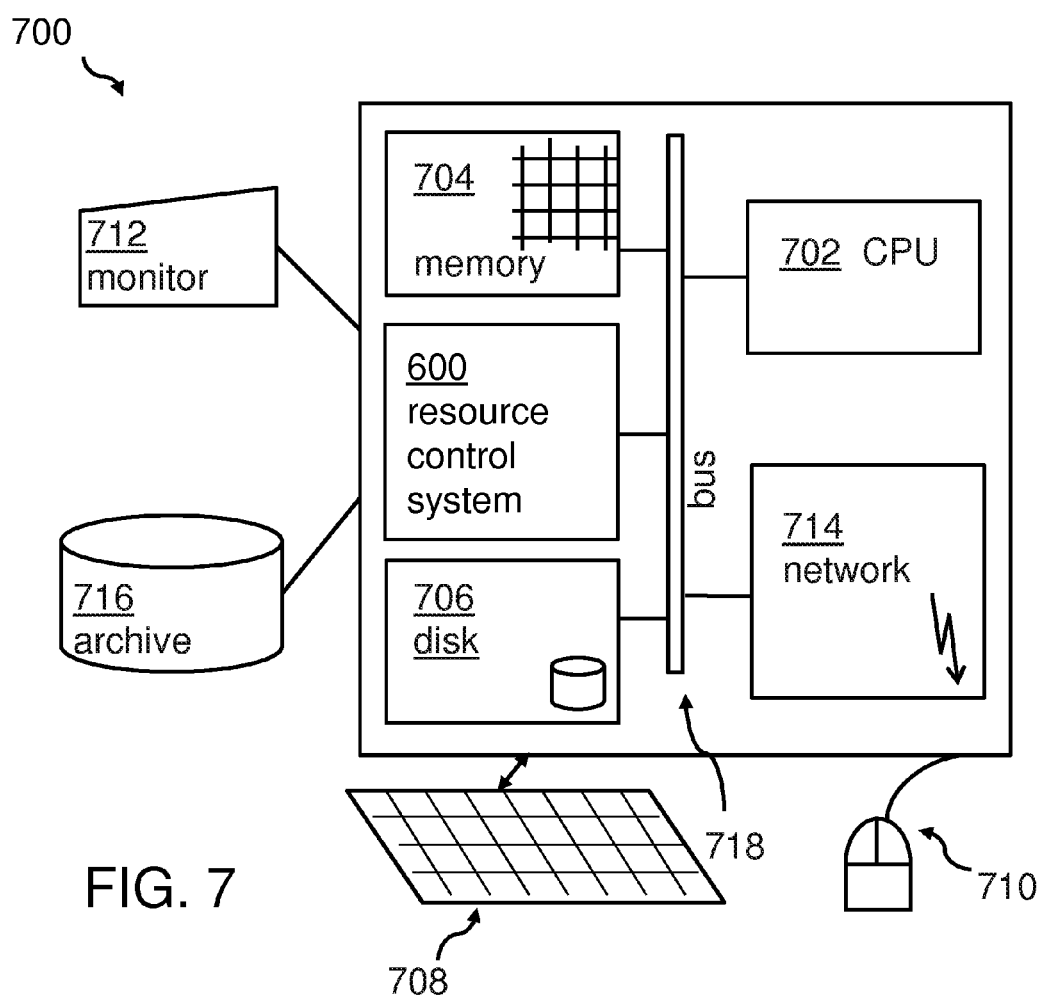
FIG. 7 shows a block diagram of a computing system comprising the resource control system.

FIG. 7 shows a block diagram of a computing system comprising the resource control system. Embodiments may be implemented together with virtually any type of computer, regardless of the platform being suitable for storing and/or executing program code. For example, as shown in FIG. 7, a computing system 700 may include one or more processor(s) 702 with one or more cores per processor, associated memory elements 704, or main memory 704, an internal storage device 706 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 704 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 716 for an execution. Elements inside the computer 700 may be linked together by means of a bus system 718 with corresponding adapters. Additionally, the resource control system 600 for controlling resource consumption in a computing system may be attached to the bus system 718.

The computing system 700 may also include input means such as a keyboard 708, a pointing device such as a mouse 710, or a microphone (not shown). Alternatively, the computing system may be equipped with a touch sensitive screen as main input device. Furthermore, the computer 700, may include output means such as a monitor or screen 712 [e.g., a liquid crystal display (LCD), a plasma display, a light emitting diode display (LED), or cathode ray tube (CRT) monitor]. The computer system 700 may be connected to a network [e.g., a local area network (LAN), a wide area network (WAN)], such as the Internet or any other similar type of network, including wireless networks via a network interface connection 714. This may allow a coupling to other computer systems, or a storage network, or a tape drive. Those, skilled in the art will appreciate that many different types of computer systems exist, and the aforementioned input and output means may take other forms. Generally speaking, the computer system 700 may include at least the minimal processing, input and/or output means, required to practice various embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" pogramming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A method for managing resource consumption in a computing system, the method comprising:
    predefining a resource policy by predefining a plurality of threshold values relating to the resource consumption, wherein the predefining includes predefining the plurality of threshold values and an action, wherein the resources are consumed by a plurality of user-defined functions performing tasks for a database management system, wherein the user-defined functions are fenced user-defined functions, wherein the user-defined function extends predefined functions of the database management system, wherein the user-defined functions are initiated by the database management system, wherein the resources comprises at least one of a number of database tables, a number of input operations per time unit, and a number of output operations per time unit, wherein the user-defined functions are executed by a plurality of processes external to the database management system; and
    performing the action, as defined by the resource policy, on at least one of the user-defined functions, wherein the action is first performed on one of a newest one of the at least one of the user-defined functions and an oldest one of the at least one of the user-defined functions, wherein the action is a queuing of a request for starting of a user-defined function additional to already executing user-defined functions when a first predefined threshold of the resource policy is exceeded, and wherein the action is a rejection of a request for starting of a user-defined function additional to already executing user-defined functions when a second predefined threshold of the resource policy is exceeded, wherein the action is a forced cancellation of a user-defined function when a third threshold of the resource policy is exceeded, wherein the first threshold is less than the second threshold and the second threshold is less than the third threshold, wherein the resource comprises an amount of main memory, wherein a calculation of the amount of main memory is based on an aggregated amount of memory of all executing user-defined functions, wherein the user-defined functions are registered as external processes to core database management system functions in a repository.

2. The method according to claim 1, wherein the resource comprises at least one of: a cache size of the database management system, a number of processor cycles, and a number of relative processor cycles.

3. The method according to claim 1, wherein the resource consumption of the user-defined function is determined according to a schedule.

4. The method according to claim 3, wherein time intervals of the schedule is dynamically adapted according to a change in the resource consumption measured over at least two time intervals of the schedule.

5. The method according to claim 1, wherein the resource consumption of the user-defined function is determined based on an existing component of an operating system of the computing system.

6. A computer program product for managing resource consumption in a computing system, the computer program product comprising a computer readable storage medium having program instructions embodied therewith, the program instructions executable by a processor to cause the processor to:
    predefine a resource policy by predefining a plurality of threshold values relating to the resource consumption, wherein the predefining includes predefining the plurality of threshold values and an action, wherein the resources are consumed by a plurality of user-defined functions performing tasks for a database management system, wherein the user-defined functions are fenced user-defined functions, wherein the user-defined function extends predefined functions of the database management system, wherein the user-defined functions are initiated by the database management system, wherein the resources comprises at least one of a number of database tables, a number of input operations per time unit, and a number of output operations per time unit, wherein the user-defined functions are executed by a plurality of processes external to the database management system; and
    perform the action, as defined by the resource policy, on at least one of the user-defined functions, wherein the action is first performed on one of a newest one of the at least one of the user-defined functions and an oldest one of the at least one of the user-defined functions, wherein the action is a queuing of a request for starting of a user-defined function additional to already executing user-defined functions when a first predefined threshold of the resource policy is exceeded, and wherein the action is a rejection of a request for starting of a user-defined function additional to already executing user-defined functions when a predefined second threshold of the resource policy is exceeded, wherein the action is a forced cancellation of a user-defined function when a third threshold of the resource policy is exceeded, wherein the first threshold is less than the second threshold and the second threshold is less than the third threshold, wherein the resource comprises an amount of main memory, wherein a calculation of the amount of main memory is based on an aggregated amount of memory of all executing user-defined functions, wherein the user-defined functions are registered as external processes to core database management system functions in a repository.

7. The computer program product according to claim 6, wherein the resource comprises at least one of: a cache size of the database management system, a number of database tables, a number of processor cycles, and a number of relative processor cycles.

8. A computer system for managing resource consumption in a computing system, the system comprising:
    a memory; and
    a processor, communicatively coupled to said memory, the computer system configured to perform a method comprising:
    predefining a resource policy by predefining a plurality of threshold values relating to the resource consumption, wherein the predefining includes predefining the plurality of threshold values and an action, wherein the resources are consumed by a plurality of user-defined functions performing tasks for a database management system, wherein the user-defined functions are fenced user-defined functions, wherein the user-defined function extends predefined functions of the database management system, wherein the user-defined functions are initiated by the database management system, wherein the resources comprises at least one of a number of database tables, a number of input operations per time unit, and a number of output operations per time unit, wherein the user-defined functions are executed by a plurality of processes external to the database management system; and performing the action, as defined by the resource policy, on at least one of the user-defined functions, wherein the action is first performed on one of a newest one of the at least one of the user-defined functions and an oldest one of the at least one of the user-defined functions, wherein the action is a queuing of a request for starting of a user-defined function additional to already executing user-defined functions when a first predefined threshold of the resource policy is exceeded, and wherein the action is a rejection of a request for starting of a user-defined function additional to already executing user-defined functions when a second predefined threshold of the resource policy is exceeded, wherein the action is a forced cancellation of a user-defined function when a third threshold of the resource policy is exceeded, wherein the first threshold is less than the second threshold and the second threshold is less than the third threshold, wherein the resource comprises an amount of main memory, wherein a calculation of the amount of main memory is based on an aggregated amount of memory of all executing user-defined functions, wherein the user-defined functions are registered as external processes to core database management system functions in a repository.

9. The method according to claim 1, wherein the action is based on one out of the group consisting of a start time of the user-defined function, and an assigned workload management priority.

10. The method according to claim 1, wherein the action is based on a size category a user-defined function is classified into.

11. The computer program product according to claim 6, wherein the action is based on a size category a user-defined function is classified into.

12. The system according to claim 8, wherein the action is based on a size category a user-defined function is classified into.

* * * * *